US007211311B2

(12) United States Patent
McDonald

(10) Patent No.: US 7,211,311 B2
(45) **Date of Patent: *May 1, 2007**

(54) FOLDED SHEETS

(76) Inventor: George Wallace McDonald, Mon Cachet, Rue de la Cache, Castel, Guernsey, Channel Islands (GB)

( * ) Notice: Subject to any disclaimer, the term of this patent is extended or adjusted under 35 U.S.C. 154(b) by 235 days.

This patent is subject to a terminal disclaimer.

(21) Appl. No.: 10/380,521

(22) PCT Filed: Sep. 13, 2001

(86) PCT No.: PCT/GB01/04113

§ 371 (c)(1),
(2), (4) Date: Aug. 25, 2003

(87) PCT Pub. No.: WO02/22375

PCT Pub. Date: Mar. 21, 2002

(65) Prior Publication Data

US 2004/0018330 A1 Jan. 29, 2004

(30) Foreign Application Priority Data

Sep. 14, 2000 (GB) ................................ 0022649.8

(51) Int. Cl.
*B32B 3/10* (2006.01)

(52) U.S. Cl. ...................... 428/126; 428/121; 428/136; 428/131; 428/130

(58) Field of Classification Search .................. 428/43, 428/131, 136, 156, 167, 130, 126, 121, 542.8; 283/34
See application file for complete search history.

(56) References Cited

U.S. PATENT DOCUMENTS

| | | | | |
|---|---|---|---|---|
| 3,655,501 | A * | 4/1972 | Tesch | 428/136 |
| 4,033,611 | A | 7/1977 | Johnsen | |
| 4,046,308 | A * | 9/1977 | Silver | 229/125.34 |
| 5,156,898 | A * | 10/1992 | McDonald | 428/100 |
| 5,360,655 | A | 11/1994 | McDonald | |
| 6,209,918 | B1 * | 4/2001 | Christopherson | 283/51 |
| 6,572,149 | B2 * | 6/2003 | Long | 283/51 |

FOREIGN PATENT DOCUMENTS

| | | | |
|---|---|---|---|
| DE | 19727844 | * | 1/1999 |
| EP | 0 378 264 | A1 | 7/1990 |
| GB | 425788 | | 3/1935 |
| GB | 2 024 716 | A | 2/1979 |
| GB | 2 218 379 | A | 11/1989 |
| WO | WO 87/04284 | | 7/1987 |

OTHER PUBLICATIONS translation of DE 19,727,844.*

* cited by examiner

*Primary Examiner*—Alexander S. Thomas
(74) *Attorney, Agent, or Firm*—Squire, Sanders & Dempsey, L.L.P.

(57) ABSTRACT

The present invention provides a sheet material (2) comprising a first fold line and a second fold line, the first and second fold lines being defined by a series of at least partial perforations (4,8) in the sheet material (2), wherein there is one or fewer at least partial perforations at an intersection of the first fold line and the second fold line.

14 Claims, 6 Drawing Sheets

FOLDED SHEETS

FIELD OF THE INVENTION

The present invention relates to folded sheets, to methods of producing folded sheets and to apparatus and methods for producing foldable sheets. The present invention further relates to related kits of parts.

BACKGROUND OF THE INVENTION

Various different ways of folding sheet material have been developed in order to allow sheets containing relatively large amounts of information to be reduced in size to manageable dimensions.

For example, European patent application number EP-A-0 288 472 discloses a folded sheet comprising a first and second set of concertina folds, which sets are transverse to one another. The arrangement of folds allows the sheet to be easily folded and unfolded by having stiff portions at diagonally opposite corner sections of the sheet.

Whilst folded sheets allow a large amount of information to be stored on an article of relatively small size, the method of manufacturing the folded sheets is complicated. In order to provide the sheet with the required folds complex folding apparatus is generally required.

The complex folding apparatus is a deterrent for small-scale manufacturers and individuals wishing to produce such folded sheets.

It is an aim of preferred embodiments of the present invention to provide a sheet material for producing folded sheets that overcomes at least one of the disadvantages of the prior art folded sheets.

It is a further aim of preferred embodiments of the present invention to provide apparatus and methods for producing foldable sheets.

SUMMARY OF THE INVENTION

According to a first aspect of the present invention, there is provided a sheet material comprising a first fold line and a second fold line, the first and second fold lines being defined by a series of at least partial perforations in the sheet material, wherein there is one or fewer at least partial perforations at an intersection of the first fold line and the second fold line.

Generally, unless otherwise stated in this application or otherwise required by the context, the phrase “fold line” refers to a line along which a fold can be formed and should not be taken to refer to a fold in the sheet material. Although the fold lines are defined by at least partial perforations, they need not be pre-folded. Preferably, the fold-lines are not pre-folded.

A partial perforation can be an indentation in the sheet that does not pierce it. A full perforation fully pierces the sheet.

Preferably there is no at least partial perforation at an intersection of a first fold line and a second fold line.

Suitably, there is a non-at least partly perforated section at an intersection of a first fold line and a second fold line.

Generally, unless otherwise stated in this application or otherwise required by the context, the phrase “non-at least partly perforated section” means a region in a series of at least partial perforations at which the spacing between the at least partial perforations is larger than the spacing between at least partial perforations other than at the non-at least partly perforated section. In the case of a series of irregularly spaced at least partial perforations, a mean average of spacing can be taken.

Suitably, the first and second fold lines are substantially perpendicular to one another.

The sheet material may comprise a plurality of first fold lines providing a first set of fold lines. Suitably, the fold lines of the first set are substantially parallel to one another.

The sheet material may further comprise a plurality of second fold lines, providing a second set of fold lines. Suitably, the fold lines of the second set are substantially parallel to one another.

Suitably, there is one or less at least partial perforations at each intersection of a first fold line and a second fold line. Preferably, there is a non-at least partly perforated section at each intersection of a first fold line and a second fold line.

Suitably there is no overlap of at least partial perforations at an intersection of a first fold line and a second fold line. Suitably, there is no overlap of at least partial perforations at each intersection of the first fold line and the second fold line.

According to a second aspect of the present invention, there is provided a sheet material comprising a first fold line and a second fold line, the first and second fold lines both being defined by a series of at least partial perforations in the sheet material, wherein there is a non-at least partly perforated section at an intersection of a fold line with an edge of the sheet material.

Suitably, the first and second fold lines are substantially perpendicular to one another.

The sheet material may comprise a plurality of first fold lines providing a first set of fold lines. Suitably, the fold lines of the first set are substantially parallel to one another.

The sheet material may further comprise a plurality of second fold lines, providing a second set of fold lines. Suitably, the fold lines of the second set are substantially parallel to one another.

Suitably, a non-at least partly perforated section is provided at the intersection of each of the first set of fold lines and each of the second set of fold lines with an edge of the sheet material.

Suitably, the at least partial perforations stop short of an intersection of a fold line with an edge of the sheet material. Suitably, the at least partial perforations stop short of an intersection of each fold line with an edge of the sheet material.

Suitably, there is no overlap of an at least partial perforation with an edge of the sheet material.

According to a third aspect of the present invention there is provided a sheet material comprising a first fold line and a second fold line, the first and second fold lines both being defined by a series of at least partial perforations in the sheet material, wherein there is one or less at least partial perforation at an intersection of the first and second fold lines and there is a non-at least partly perforated section at an intersection of a fold line with an edge of the sheet material.

Suitably, the first and second fold lines are substantially perpendicular to one another.

The sheet material may comprise a plurality of first fold lines providing a first set of fold lines. Suitably, the fold lines of the first set are substantially parallel to one another.

The sheet material may further comprise a plurality of second fold lines, providing a second set of fold lines.

Suitably, the fold lines of the second set are substantially parallel to one another.

Suitably, at each intersection of the first set of fold lines and the second set of fold lines there is one or less at least partial perforation.

Preferably there is no at least partial perforation, at the intersection of the first fold line and the second fold line. Preferably there is no at, least partial perforation at each intersection of the first fold line and the second fold line.

Suitably, there is a non-at least partly perforated section at each intersection of the first set of fold lines and the second set of fold lines.

Suitably, there is a non-at least partly perforated section at the intersection of each of the first set of fold lines and each of the second set of fold lines with an edge of the sheet material.

Suitably there is no overlap of at least partial perforations at an intersection of a first fold line and a second fold line. Suitably, there is no overlap of at least partial perforations at each intersection of the first fold line and the second fold line.

Suitably, the at least partial perforations stop short of an intersection of a fold line with an edge of the sheet material. Suitably, the at least partial perforations stop short of an intersection of each fold line with an edge of the sheet material.

Suitably, there is no overlap of a at least partial perforation with an edge of the sheet material.

In each aspect of the present invention the series of at least partial perforations, when full perforations defining a fold line comprises a plurality of incisions in the sheet material, each incision providing a a full perforation, which incisions are spaced apart from on another. The incisions may be in the form of elongate lines or they may be in the form of dots.

Suitably, the spacing of the at least partial perforations in a non-at least partly perforated section is substantially larger than the spacing between at least partial perforations other than at the non-at least partly perforated section.

Suitably, the spacing between at least partial perforations at the non-at least partly perforated section is at least twice, preferably at least three times and more preferably at least four times the length of the spacing between at least partial perforations other than at the non-at least partly perforated section.

Suitably, the spacing between at least partial perforations at the non-at least partly perforated section is less than twenty times, preferably less than fifteen times and more preferably less than ten times the length of the spacing between at least partial perforations other than at the non-at least partly perforated section.

The non-at least partly perforated s ction at an inters ction of a first and second fold line is suitably between 3–6 mm long, and preferably between 4–5 mm long, most preferably it is about 4 mm long.

Suitably, the non-at least partly perforated section at the intersection of a fold line with an edge of the sheet is about 1–4 mm, preferably it is about 2 mm.

In each aspect of the invention, the spacing between a pair of adjacent at least partial perforations on a fold line may be greater than the length of a at least partial perforation. For a series of non-uniform length at least partial perforations, a mean average of the adjacent at least partial perforations may be taken. However, the spacing between the at least partial perforations may be the same as or less than the length of the adjacent at least partial perforations.

The length of the at least partial perforations and the spacing between the at least partial perforations will affect the ease with which a fold line can be folded, the strength of the fold line (or resistance to tearing) and the ease with which the sheet will pass through a desk top printer.

Generally, the larger the at least partial perforations length, the easier it is to fold along a fold line. However, longer at least partial perforations are more susceptible to tearing during printing and handling and sheets comprising fold lines defined by longer at least partial perforations are generally more difficult to feed through a standard desk top printer.

Shorter at least partial perforations are generally less susceptible to tearing and sheets comprising shorter at least partial perforations generally feed more easily through a standard desk top printer. However, fold lines defined by shorter at least partial perforations will generally be more difficult to fold.

These characteristics of the at least partly perforated sheet are not defined solely by the at least partial perforation length. The spacing of the at least partial perforations will also be a relevant factor.

Suitably, the at least partial perforation length is no more than five times, preferably no more than four times and more preferably no more than three times the length of the spacing between adjacent at least partial perforations. Suitably, the at least partial perforation length is at least a quarter of, preferably at least half and more preferably at least the same as the length of the spacing between adjacent at least partial perforations.

Generally, the shorter the spacing between adjacent at least partial perforations, the weaker the fold line will be and the easier the fold line will be to fold. Generally, the longer the spacing between adjacent at least partial perforations the stronger the fold line, but the more difficult the fold line will be to fold.

The strength, foldability and printability of a sheet comprising fold lines defined by at least partial perforations will also be affected by other factors, such as, paper density and type (e.g. grain of paper).

The length of at least partial perforation and the spacing between adjacent at least partial perforations chosen will depend to a large extent on the intended use of the final product. For some applications easier printing and stronger fold line will be more important than ease of folding.

In each aspect of the invention, the spacing between adjacent at least partial perforations is suitably uniform along the length of each fold line.

Alternatively, the spacing between adjacent at least partial perforations may vary along the length of each fold line.

Suitably, the spacing between adjacent at least partial perforations is the same for all of the fold lines in the sheet material. Alternatively, the spacing between adjacent at least partial perforations may vary between each fold line.

Suitably, the spacing between each at least partial perforation is at least 0.5 mm, preferably at least 1 mm and more preferably at least 1.5 mm. Suitably, the spacing between each at least partial perforation is less than 5 mm, preferably less than 4 mm and more preferably less than 3 mm.

In each aspect of the invention, each series of at least partial perforations defining a fold line suitably comprises at least partial perforations of uniform length.

Alternatively, a series of at least partial perforations defining a fold line may comprise at least partial perforations of various different lengths. In this case, the spacing between two adjacent at least partial perforations may be greater than the length of either of the two at least partial perforations.

Suitably the length of each at least partial perforation is the same for all of the fold lines in a sheet material.

Alternatively, the length of the at least partial perforations may vary between different fold lines.

Suitably, the length or diameter of each at least partial perforation is at least 0.25 mm, preferably at least 0.5 mm, more preferably at least 1 mm and particularly at least 2 mm. Suitably, the length or diameter of each at least partial perforation is less than 5 mm, preferably less than 4 mm and more preferably less than 3 mm.

The at least partial perforations are intended to provide a means of defining the fold lines only. The at least partial perforations are not intended to provide tear lines in the sheet material. An advantage of the present invention is that at least partly perforated sheets for folding are provided which have improved resistance to tearing along the fold line.

A sheet in accordance with any aspect of the invention may be provided with at least one additional at least partly perforated line, which at least one additional at least partly perforated line is or are designed to tear more easily than the at least partly perforated fold lines.

Thus, a folded sheet may be provided with tear off sections.

One or more additional non-at least partly perforated sections may be provided on a fold line as well as the non-at least partly perforated sections at the intersections of first and second fold lines and the intersection of a fold line with the edge of a sheet.

Suitably, the additional non-at least partly perforated sections are located at regions of the fold line between intersections of fold lines and/or between a point of intersection of two fold lines and an intersection of a fold line with an edge of the sheet.

Provision of additional non-at least partly perforated sections along the length of a fold line advantageously improves the strength of a fold line.

The sheet material may comprise any substrate, but will usually be one that takes print. Suitably, the sheet material comprises a paper based sheet material. Any type and/or density of paper which can be used with a standard desk top printer can be used. For example, a suitable density for a paper sheet material is about 50–400 gsm. Alternatively, plastics based sheet materials or board may be used. If thicker sheet material is used, full perforations make folding easier.

The sheet size may be any suitable sheet size. Suitably, the sheet size is A3, A4, A5, foolscap or American legal.

By way of example, the sheet material may comprise a first set of folds comprising a plurality of fold lines and a single second fold line. Suitably, the fold lines of the first set are substantially parallel to one another. Suitably, the second fold line is substantially perpendicular to the first set of fold lines.

In use of this embodiment of the invention, the first set of fold lines are first folded in a concertina fashion relative to one another to define the folds, then the sheet is flattened out and the sheet is folded along the second fold line, to define that fold. To assemble the sheet into a folded article, the sheet is suitably first folded about the concertina fold lines and then the concertina folded sheet is folded again along the second fold line.

By way of example, the sheet material may comprise a first set of fold lines, comprising a plurality of fold lines that are substantially parallel to one another, and a second set of fold lines, comprising a plurality of fold lines that are also substantially parallel to one another. Suitably, the first set of fold lines is substantially perpendicular to the second set of fold lines.

In use of this embodiment of the invention, each of the first set of fold lines is folded in a concertina fashion relative to one another. Preferably, the sheet is then unfolded and laid substantially flat before folding each of the second set of fold lines in a concertina fashion relative to one another. Flattening the sheet between folding the first and second sets of folds advantageously allows for better fold definition of the second set of folds. To assemble the sheet into a folded article, the sheet is suitably concertina folded about the first, set of folds and then the concertina folded sheet is concertina folded about the second set of folds.

Any suitable arrangement of fold lines and manner of folding may be used. For example, a set of parallel fold lines need not be concertina folded.

There are different types of at least partial perforations. Some at least partial perforations provide only indentations in a sheet, whereas others actually penetrate through a sheet. Again, the type of at least partial perforation chosen will depend to a large extent on the intended application of the final product. Generally, at least partial perforations which do not penetrate the sheet provide stronger folds that are less susceptible to tearing, but are more difficult to fold.

Both types of at least partial perforations affect the nature of the surfaces of the sheet. The top surface, onto which the at least partial perforations are applied, will generally be relatively smooth compared to the bottom surface, because the at least partial perforations push the bottom paper surface outwards.

When folding a sheet along a at least partly perforated fold line it is generally easier to make the fold on the smooth surface (i.e. so that two sections of the smooth surface are bought into a face to face relationship when the sheet is folded).

The sheet may be provided with visual indicia to indicate where and/or how the sheet should be folded. The visual indicia may comprise printed instructions on the sheet, for example. Alternatively, or in addition, the sheet material may be provided with watermarks therein to illustrate a suitable manner of folding of the sheet.

When printing the sheet, information may be printed into discrete panels provided by intersection of first and second fold lines. Alternatively, or in addition, information may be printed over more than one panels of the sheet. Substantially the whole surface may be printed over. In these cases, printing over a fold line may serve to enhance visibility of the fold line.

Any type of information for example, written or pictorial information may be printed onto the sheet. Furthermore, one or both surfaces of the sheet may receive printed information. The whole of each surface may receive print. Alternatively, or in addition, only part of a surface may receive print.

A sheet in accordance with any aspect of the present invention may advantageously be supplied with at least one cover portion. Suitably, the at least one cover portion is or are applied to the sheet after the sheet material has been printed. Suitably, the at least one cover portion is or are applied to the sheet after the sheet material has been folded.

Suitable cover portions include individual portions having a size about the same as or, preferably, slightly larger than the siz of a segment of the sheet material onc folded.

Alternatively, the at least one cover portion may comprise a portion designed to be folded over the sheet material when folded, in a similar manner to the way a book cover folds around the pages of a book. A fold-over cover portion may comprise a plurality of fold lines to provide a spine at the fold, allowing for improved coverage when used with thicker folded sheets.

The at least one cover portion suitably comprises a material that is thicker than the sheet material. Suitably, the cover portion is thin enough to feed through a standard desk top printer. The at least one cover portion may comprise a paper-based material, such as a board material. If a thicker board is required, sections may be removed therefrom to provide holes in the cover portion.

The at least one cover portion may comprise a plastics material. The plastics material may be opaque, translucent or transparent. Advantageously, the plastics material can be thicker than a board cover portion if it is translucent or transparent as it need not be fed through a printer.

The at least one cover portion may be attached to the sheet material by any suitable means. Suitably, the at least one cover portion is or are attached to the folded sheet material by means of an adhesive. Suitably, the adhesive is applied to the at least one cover portion in the form of a pressure sensitive strip of adhesive.

Suitably, the adhesive is protected by a silicone release paper.

The adhesive may be applied to the cover portion and/or a region of the sheet. If the adhesive is applied to the sheet, it is suitably applied to the region of attachment of the cover portion only.

In use, the sheet is suitably folded along the at least partly perforated fold lines, then the silicone strip is removed from the adhesive strip and the at least one cover portion is applied to the folded sheet material.

Suitably, the sheet material has a cover portion applied to opposite corners of the sheet. The corners may be diagonally and/or longitudinally opposite corners.

Information and/or decoration may be applied to a cover portion before or after it is applied to the sheet material. Suitably, information and/or decoration is printed onto a cover portion. Suitably, information and/or decoration is applied to a cover portion before it is applied to a sheet material.

If the at least one cover portion comprises a translucent or transparent plastics material, the information which would have been applied to the cover portion may be applied to the segment of the sheet material to which the cover portion will be attached. In this case, there need not be any information and/or decoration applied to the cover portion. Furthermore, a translucent or transparent cover portion allows use to be made of the full surface of the sheet material.

Instead of or as well as a cover portion a segment of the sheet material may be treated to make it stiffer than th rest of the sheet. For example, a UV curable resin may be soaked, printed, or otherwise applied to a segment and then cured to provide a stiff portion.

According to a fourth aspect of the invention, there is provided a method of producing a folded sheet comprising the steps of:

(a) providing a sheet material according to any preceding aspect of the present invention, (b) applying information and/or decoration onto the sheet of step (a), followed by (c) folding the sheet material along fold lines defined by the at least partial perforations.

Suitably, the information and/or decoration is printed onto the sheet.

The method may further include the step of applying one or more cover portions to the sheet material. The one or more cover portions may be applied either before or after the sheet material is folded. Preferably, the one or more cover portions is or are applied to the sheet material after step (b).

The one or more cover portions may have information and/or decoration applied thereto before the one or more cover portions is applied to the sheet. The cover portion suitably has information and/or decoration printed thereon.

The method may involve use of folding and/or binding machinery.

According to a fifth aspect of the invention, there is provided a kit of parts comprising a sheet material according to any other aspect of the present invention and a cover portion for attachment to the sheet material.

The present invention advantageously provides a sheet material that can be easily printed on, with a laser printer or the like, and then easily manually folded to provide a folded printed sheet without the requirement for expensive folding machinery.

A folded sheet in accordance with preferred embodiments of the present invention advantageously allows an individual or small-scale printer to easily produce printed folded sheets.

Furthermore, ensuring that there is a non-at least partly perforated section at the intersection of fold lines reduces the likelihood of a tear developing at these intersections. Likewise, ensuring that there is a non-at least partly perforated section at the intersection of a fold line with an edge of the sheet reduces the likelihood of the sheet tearing at the edge thereof at the fold lines.

Conventional at least partly perforated tear lines in sheet material can form ridges in the sheet. When a plurality of sheets are stacked one on top of the other, these ridges can cause unevenness in the thickness of the stack. Furthermore, these ridges often can cause the sheet material being fed through a printer to get stuck in the printer. Providing a sheet having fold lines defined by at least partial perforations, wherein the spacing between the at least partial perforations is greater than the length of the at least partial perforations reduced the degree of distortion of the sheet material in the region of the at least partial perforations and overcomes these problems associated with at least partly perforated tear lines, thus allowing a stack of sheets to be loaded on a printer and used without jamming the printer. Alternatively, the at least partial perforations my be misaligned.

Different patterns of at least partial perforations and non-at least partly perforated regions can be used to provide sheets having fold lines of different strengths. For example, greater spacing between the at least partial perforations and/or a greater number of non-at least partly perforated sections on a fold line, will provide a stronger sheet, which is less susceptible to tearing.

For applications that are intended to be used for short periods, for example, 1 day or 1 week, the fold lines need not be as strong as sheets that are intended to be used for much longer, say a year.

According to the present invention in a sixth aspect, there is provided apparatus for producing a foldable sheet, the apparatus comprising a plurality of rigid portions in a spaced array and means for substantially securing the rigid portions relative to one another.

The gaps between the rigid portions can be used to impress fold lines into a sheet material by pressing the sheet into the apparatus, by hand or, for instance, using a roller.

Suitably, the rigid portions are flexibly joined together so that a sheet material can be lain on to the apparatus, which is folded as desired, forcing the appropriate folded shape into the sheet material.

Suitably, the rigid portions are substantially rectangular. Suitably, the rigid portions are a sheet material (ie relatively thin).

Suitably, the rigid portions are metallic, preferably aluminium.

Suitably, the securing means comprises flexible plastic sheet to which the rigid portions are secured, preferably adhesively secured.

Suitably, the rigid portions are arranged in a substantially rectangular array. Suitably, there are more rigid portions in one direction of the array than the other.

Suitably, the apparatus is for producing a concertina foldable sheet. Suitably, the apparatus is for producing a sheet with a first set of concertina folds in a first direction and a second set of concertina folds in a second direction, the first direction being generally transverse to the second direction.

Suitably, the apparatus includes means for creating at least partial perforations in the fold lines of the sheet.

According to the present invention in a seventh aspect, there is provided a method of producing foldable sheets, which method comprises the steps of: with an apparatus according to the sixth aspect of the present invention, forming fold lines in a sheet of material.

Suitably, the fold lines are formed by pressing the apparatus and the sheet together. This may be by one being forced into the other or the two being pressed together.

Suitably, the apparatus is folded about the sheet material.

According to the present invention in an eighth aspect, there is provided apparatus for producing a folded sheet, the apparatus comprising a roller, which roller comprises means for at least partly perforating a sheet.

Suitably, the at least partial perforating means comprises a plurality of spikes or a plurality of indentations.

According to the present invention in a ninth aspect, there is provided a sheet of material which has folds in it, regardless of whether it is in a folded up condition or not unless the context otherwise requires, and that takes folds at which it can be easily unfolded (without the folds disappearing) and refolded, the sheet having a first set of concertina folds and, so as to b transverse to these when the sheet is folded with these folds, a second set of concertina folds, in which the sheet is provide with two diagonally opposite, defined, stiff portions at segments thereof, which segments are at or near diagonally opposite corners of the sheet and defined by fold/s and/or edge/s thereof, which sheet is according to any of the first to third aspects of the present invention.

BRIEF DESCRIPTION OF THE DRAWINGS

The present invention will now be described, by way of example only, with reference to the following drawings, in which.

DESCRIPTION OF THE PREFERRED EMBODIMENTS

Figure 1:
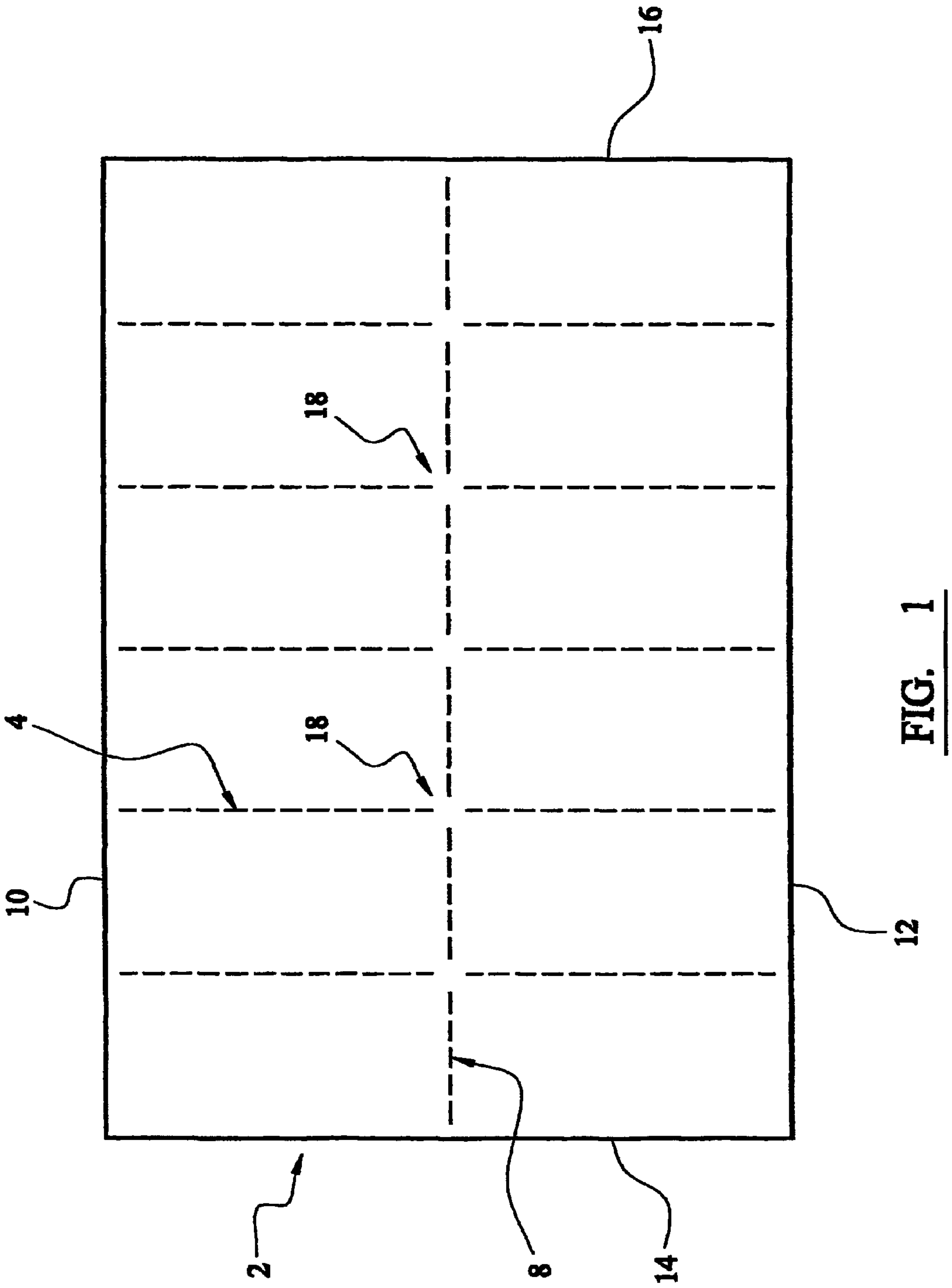
FIG. 1 is a schematic plan view of a sheet material.
Figure 3:
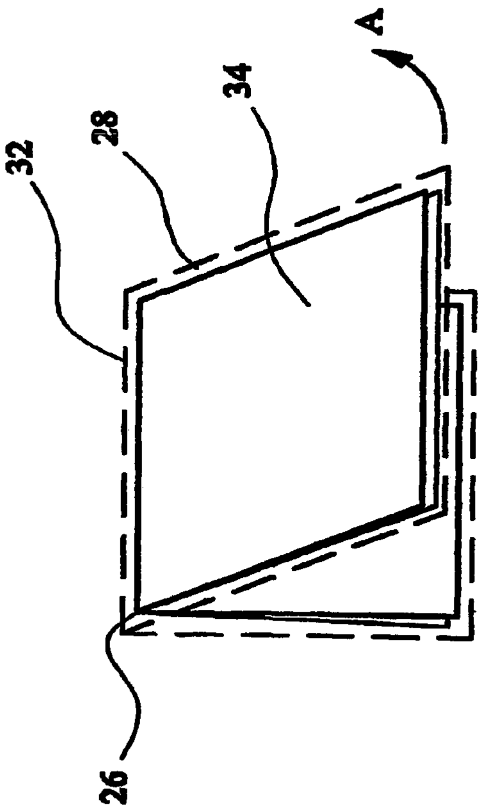
FIG. 3 shows the sheet of FIGS. 1 and 2 in a further folded condition.
Figure 2:
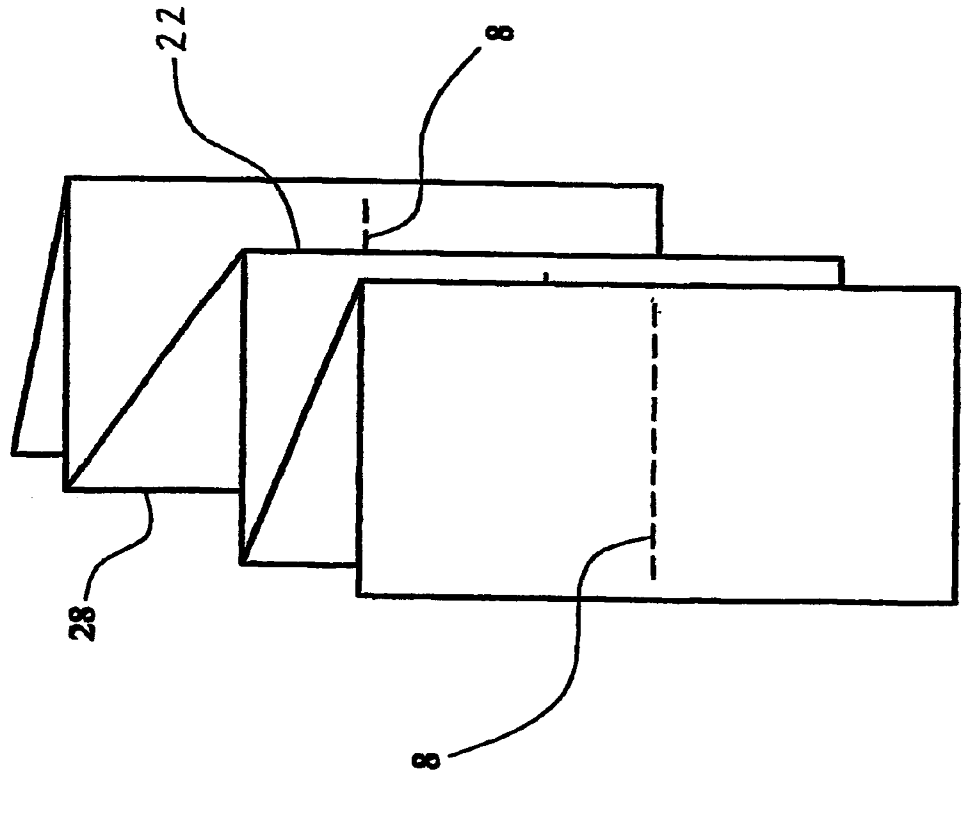
FIG. 2 shows the sheet of FIG. 1 in a partially folded condition.

FIGS. 1, 2 and 3 show a sheet 2 comprising a first set of fold lines each defined by a series of perforations 4 and a second fold line defined by a series of perforations 8. The sheet 2 has opposed edges 10, 12 and 14, 16 respectively.

The series of perforations 4, defining the first set of fold lines, comprise perforations of equal length being equally spaced from one another except at the non-perforated sections. The spacing between the perforations is greater than the length of the perforations.

The perforations 8, defining the second fold line, comprise perforations of equal length being equally spaced apart from one another except at the non-perforated sections. The spacing between the perforations is greater than the length of the perforations.

The length of the perforations for each of the first set of fold lines and each of the second set of fold lines is 1.5 mm and the spacing between adjacent fold lines is about 0.75 mm.

Each series of perforations 4, 8 stop short of the relevant edges 10, 12, 14 and 16 of the sheet material 2, providing a non-perforated section about 2 mm long.

Furthermore, there is a non-perforated section on each fold line at each intersection 18 of a series of perforations 4, with the series of perforations 8. Each of these non-perforated sections is about 4 mm long.

The fold lines define a set of panels on the sheet comprising 6 columns and two rows.

The sheet material 2 may be fed through a printer in either a landscape or portrait orientation to impart information thereto.

Thereafter, the sheet 2 may be folded along the fold lines defined by the series of perforations 4 and 8 to provide a more conveniently sized product suitable for storage in a pocket. After folding the cover 28 is applied to the sheet 2.

FIG. 2 illustrates a first stage of folding the sheet 2, wherein the sheet 2 is folded in a concertina fashion about fold lines 22, defined by series of perforations 4.

FIG. 3 illustrates a further stage of folding, wherein the folded sheet of FIG. 2 is folded along fold line 26, defined by series of perforations 8.

FIG. 3 also illustrates how a fold over cover 28 may be located relative to the folded sheet 2. The fold over cover 28 is illustrated by broken lines. The cover 28 comprises a single piece of cardboard material, or the like, which is folded about fold line 32 and then attached to the outer sections of the folded sheet 2. Suitably, the cover 28 is attached to the folded sheet 2 by means of pressure sensitive adhesive strip (not shown).

To open the folded sheet 2, section 34 of the cover 28 is moved in the direction indicated by arrow A, thereby unfolding the cover 28 about fold line 32 and unfolding the sheet 2 about fold line 26.

Figure 4:
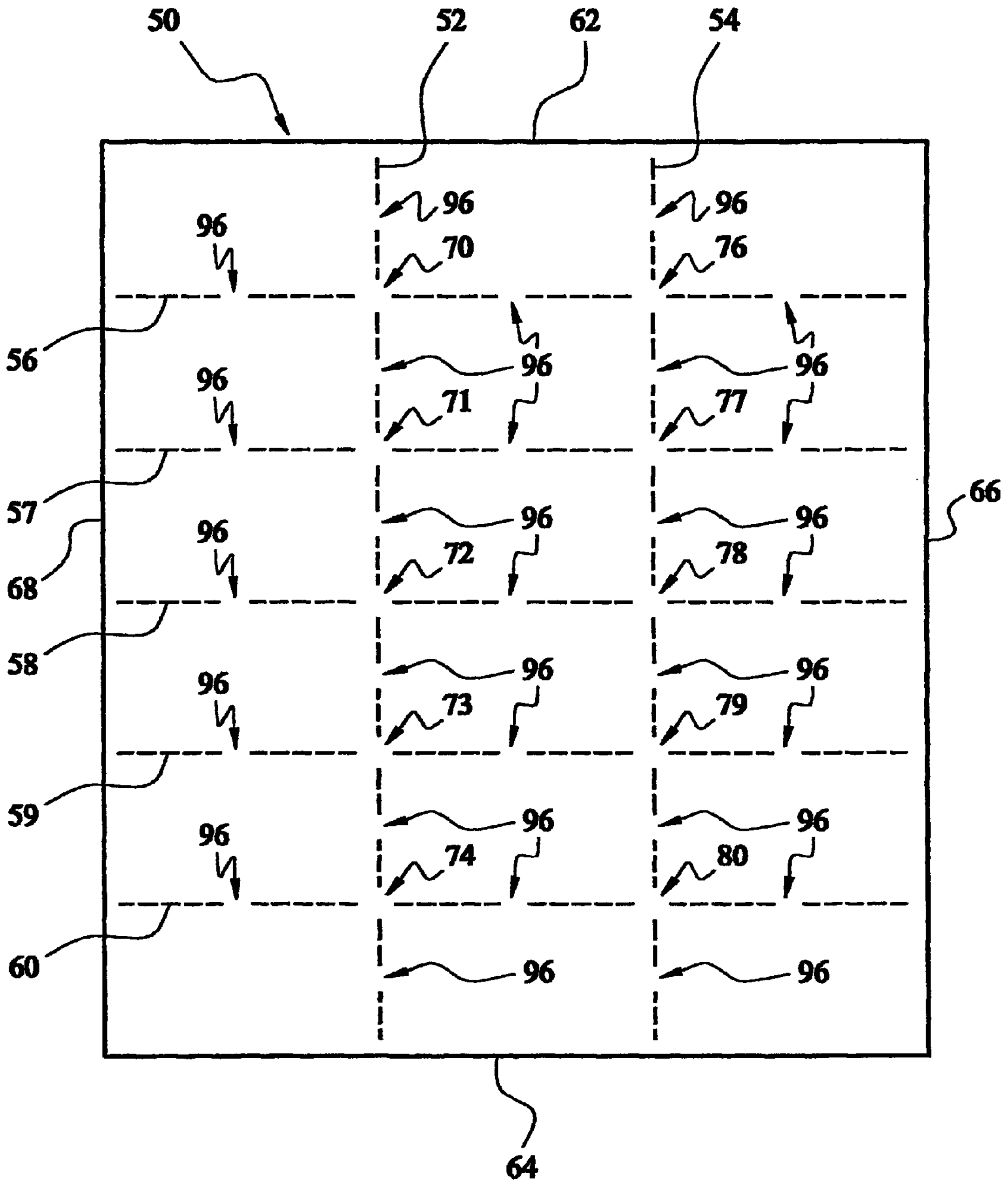
FIG. 4 is a schematic plan view of an alternative sheet material.
Figure 6:
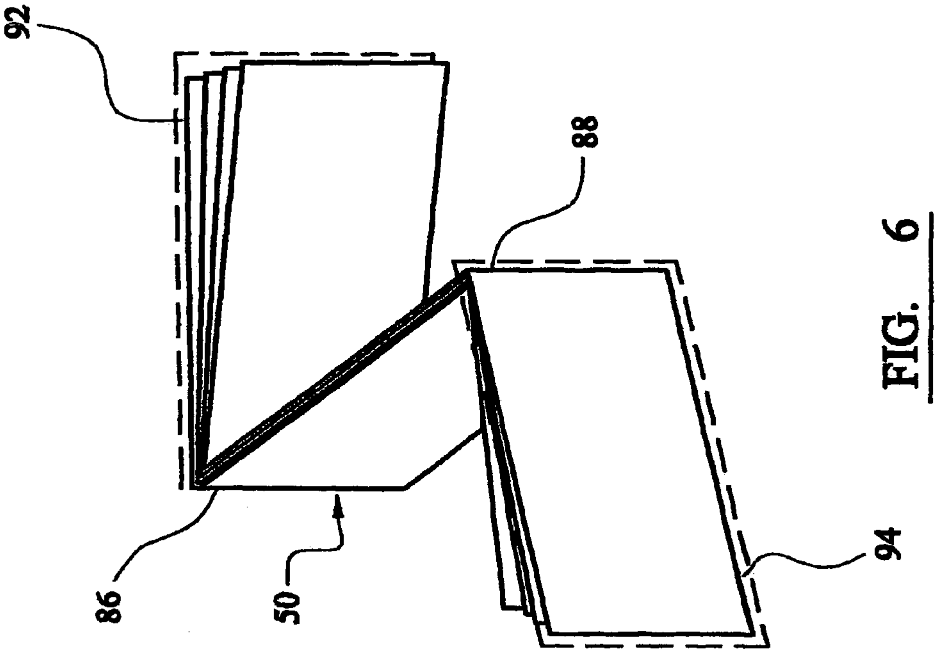
FIG. 6 shows the sheet of FIGS. 4 and 5 in a further folded condition.
Figure 5:
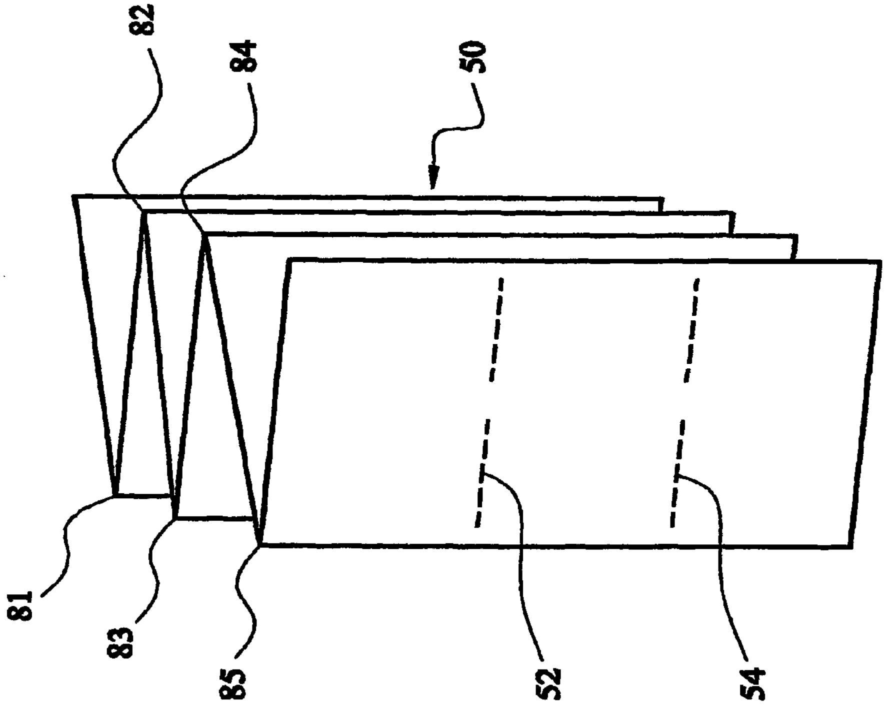
FIG. 5 shows the sheet of FIG. 4 in a partially folded condition.

FIGS. 4, 5 and 6 illustrate an alternative sheet 50, comprising a first set of fold lines, defined by series of perforations 52 and 54, and a second set of fold lines, defined by series of perforations 56, 57, 58, 59 and 60.

Each series of perforations 52, 54, 56, 58 and 60 comprises non-perforated regions 96 to provide stronger fold lines more resistant to tearing. The non-perforated regions 96 are between fold line intersections and/or between a fold line intersection and an intersection of a fold line with an edge of the sheet.

The non-perforated regions 96 are about 2 mm long.

Each series of perforations 52, 54, 56, 57, 58, 59 and 60 all comprise perforations of equal length being equally spaced from one another except in the non-perforated sections. In each case, the spacing between the perforations is greater than the length of the perforations.

In this embodiment the perforations are about 0.5 mm long and the spacing between adjacent perforations is about 0.5 mm.

Each series of perforations 52, 54, 56, 57, 58, 59 and 60 stops short of the edges 62, 64, 66 and 68 of the sheet 50, providing a non-perforated section in these regions about 2 mm in length.

Furthermore, at the points of intersection 70, 71, 72, 73, 74, 76, 77, 78, 79 and 80 of the series of perforations 52 and 54 with the series of perforations 56, 57, 58, 59 and 60 there is a non-perforated section about 4 mm in length.

FIG. 5 illustrates a first stage of folding sheet 50, wherein the sheet 50 is folded in a concertina along fold lines 81, 82, 83, 84 and 85 defined respectively by series of perforations 56, 57, 58, 59 and 60.

FIG. 6 illustrates a further stage of folding the folded sheet 50 as shown in FIG. 5, wherein the sheet 50 is folded in a concertina fashion along fold lines 86 and 88 defined respectively by series of perforations 52 and 54.

FIG. 6 also shows, in broken lines, location of separate cover portions 92 and 94 to the folded sheet 50, which cover portions 92, 94 are applied to the sheet 50 by means of an adhesive (not shown). When folded the sheet 50 of FIGS. 4, 5 and 6 can conveniently be stored in a wallet.

Figure 7:
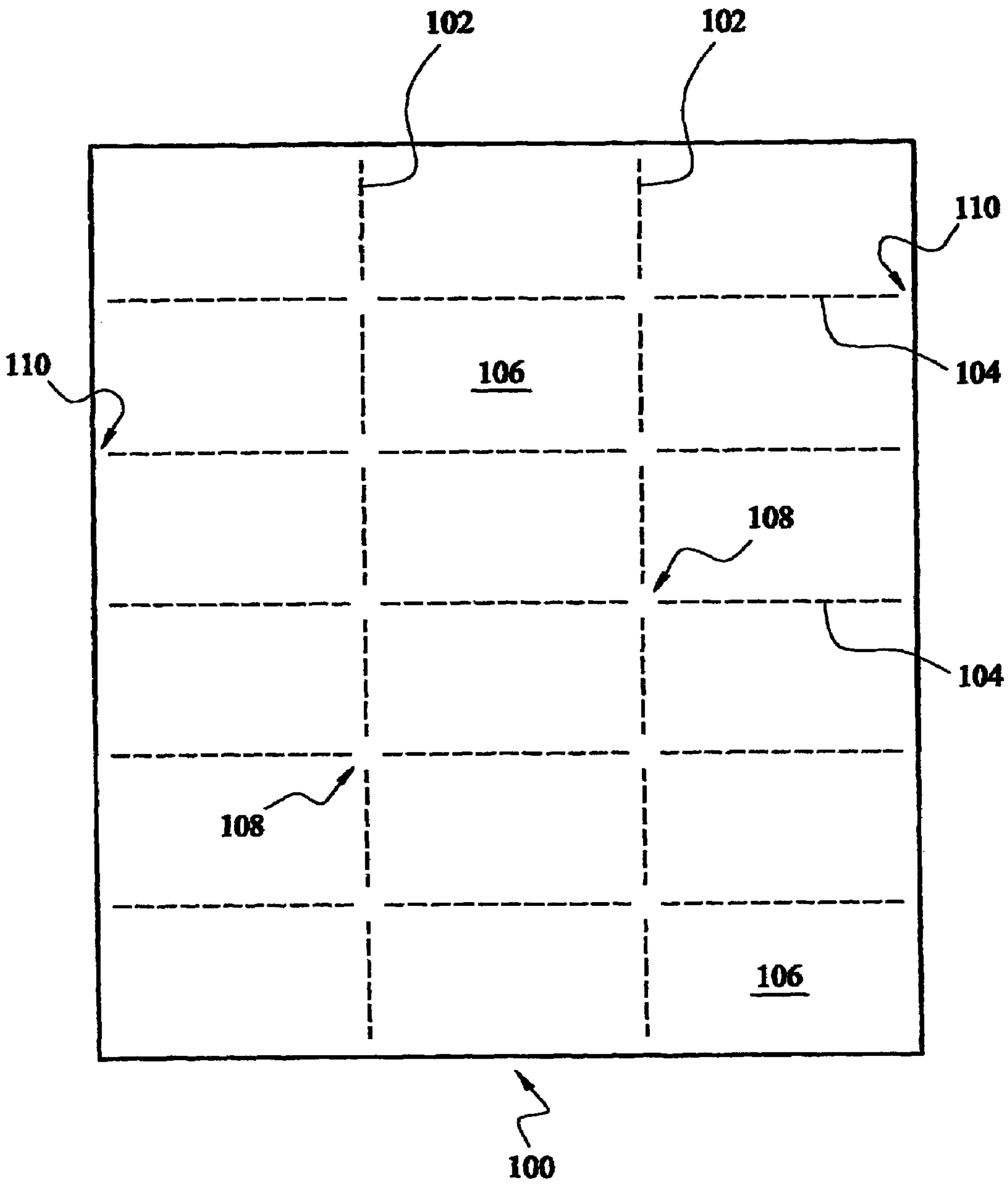
FIG. 7 shows a schematic plan view of another sheet material.

FIG. 7 illustrates an A4 sheet 100 having a first set of fold lines defined by perforated lines 102 and a second set of fold lines defined by perforated lines 104. The first and second sets of folds divide the sheet 100 into a series of panels 106. The panels 106 are arranged as three columns and six rows.

The length of each perforation is about 1.5 mm and the spacing between adjacent perforations is about 1 mm. The non-perforated region 108 at the intersection of first and second fold lines is about 4 mm and the non-perforated region 110 at the intersection of a fold line with the edge of the sheet 100 is about 2 mm.

Suitably, the short edge of each panel 106 comprises about 17 perforations and the long edge of each panel 106 comprises about 30 perforations.

Alternatively, the perforations may be about 1 mm and the spacing between adjacent perforations may be about 0.5 mm. In this case, the short edge of each panel 106 will comprise about 32 perforations and the long side of each panel 106 will comprise about 47 perforations.

For an A4 sheet divided into three columns and six rows each short edge of a panel 106 suitably comprises from 15–35 perforations and each long edge suitably comprises between 25–50 perforations.

Perforations may be full incisions or partial indentations.

Figure 8:
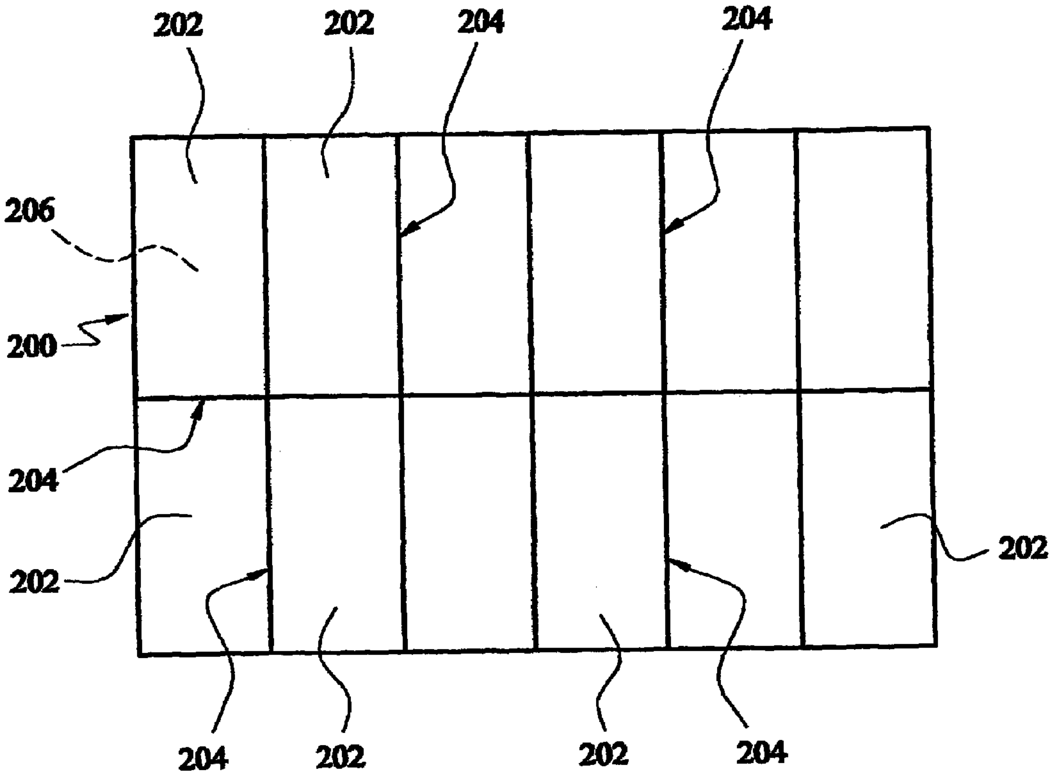
FIG. 8 shows a plan view of an apparatus for producing folded sheets.

FIG. 8 shows a jig or apparatus 200 for producing foldable sheets. The apparatus 200 comprises an array of thin (about 1 mm) rectangular metallic (aluminium or plastics) rigid portions 202. The rigid portions 202 are in a rectangular array with more rigid portions in one direction than the other (ie 6×2 in this example). The rigid portions 202 have slight gaps 204 therebetween and are secured relative to one another by an adhesive plastics backing sheet 206.

In use a paper sheet to be folded is forced to take up fold lines from the apparatus 200 by either being pressed hard into the surface of the apparatus 200, using something along the lines of a rolling pin or, alternatively, the sheet to be folded is lain over the apparatus 200 and the apparatus 200 is folded in the manner desired inducing fold lines in the sheet. To emphasise the fold lines, a mating rigid plate (not shown) with protrusions aligning with gaps 204 can be used to sandwich the sheet in which fold lines are desired.

In an alternative embodiment, the rigid portions 202 may, include spikes or projections to generate perforations in the fold lines of a sheet.

Indentations or full perforations can also be produced in a sheet using a paper guillotine device that does not fully cut a sheet. The guillotine blade may indent the sheet or include spikes or the like to generate full perforations.

Figure 9:
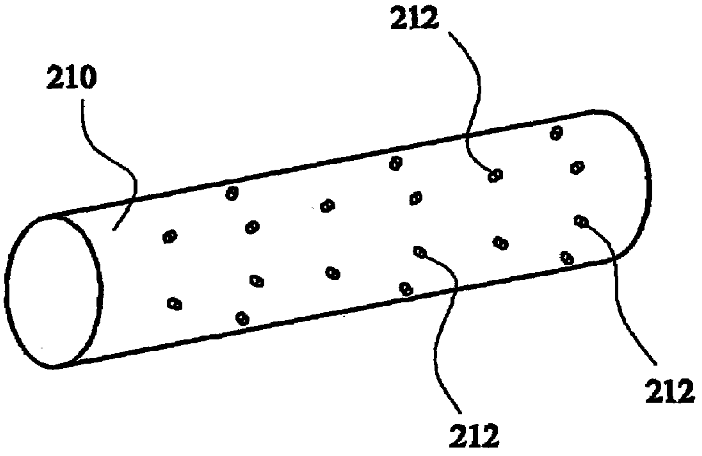
FIG. 9 shows a schematic perspective view of a roller for use in producing perforated sheets.

Referring to FIG. 9 of the drawings that follow, there is shown a roller 210 usable to produce perforations in a sheet. The roller 210 has outwardly extending spikes 212 to generate perforations in a sheet as the sheet passes the roller 210. A pinch roller (not shown) can be used to press a sheet onto the spikes 212. Protrusions, instead of spikes, can be used to generate indentations. Preferably, the roller 210 is mounted in a printer (not shown) so the sheet can be printed and at least partly perforated in one step.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A sheet material comprising a first fold line and a second fold line, the first and second fold lines being defined by a series of at least partial perforations in the sheet material, wherein there are no at least partial perforations at an intersection of the first fold line and the second fold line, wherein an intersection spacing is defined, and wherein the intersection spacing in a direction along either the first or second fold lines is larger than the spacing between the at least partial perforations of the first or second fold lines, wherein there is a non-perforated section at an intersection of a fold line with an edge of the sheet material, and in which the at least partial perforations stop short of an intersection of a fold line with an edge of the sheet material; and wherein amongst at least one series of the at least partial perforations there is a further non-perforated section located between a first fold line intersection and one of a second fold line intersection and an intersection of a fold line with an edge of the sheet, and wherein in a direction along the at least one fold line the length of the further non-perforated section is greater than the spacing between the at least partial perforations.

2. A sheet material according to claim 1, in which the first and second fold lines are substantially perpendicular to one another.

3. A sheet material according to claim 1, in which the sheet material comprises a plurality of first fold lines providing a first set of fold lines.

4. A sheet material according to claim 3, in which the fold lines of the first set are substantially parallel to one another.

5. A sheet material according to claim 3, in which the sheet material further comprises a plurality of second fold lines, providing a second set of fold lines.

6. A sheet material according to claim 5, in which the fold lines of the second set are substantially parallel to one another.

7. A sheet material according, to claim 1, in which there is no overlap of a at least partial perforation with an edge of the sheet material.

8. A sheet material according to claim 1, in which the spacing between a pair of adjacent at least partial perforations on a fold line is greater than the length of a at least partial perforation.

9. A sheet material according to claim 1, in which the sheet material is provided with at least one additional perforated line, which at least one additional perforated line is or are designed to tear more easily than the perforated fold lines.

10. A sheet material according to claim 1, in which additional non-perforated sections are located at regions of the fold lines between intersections of fold lines and/or between a point of intersection of two fold lines and an intersection of a fold line with an edge of the sheet.

11. A sheet material according to claim 1, in which a sheet is supplied with at least one cover portion.

12. A sheet material according to claim 11, in which the at least one cover portion is or are applied to the sheet after the sheet material has been printed.

13. A sheet material according to claim 11, in which the at least one cover portion is or are applied to the sheet after the sheet material has been folded.

14. A kit of parts comprising a sheet material according to claim 1 and a cover portion for attachment to the sheet material.

* * * * *